Feb. 5, 1952  C. A. ABLETT  2,584,652
ROLLER THRUST BEARING
Filed Nov. 14, 1949  4 Sheets-Sheet 1
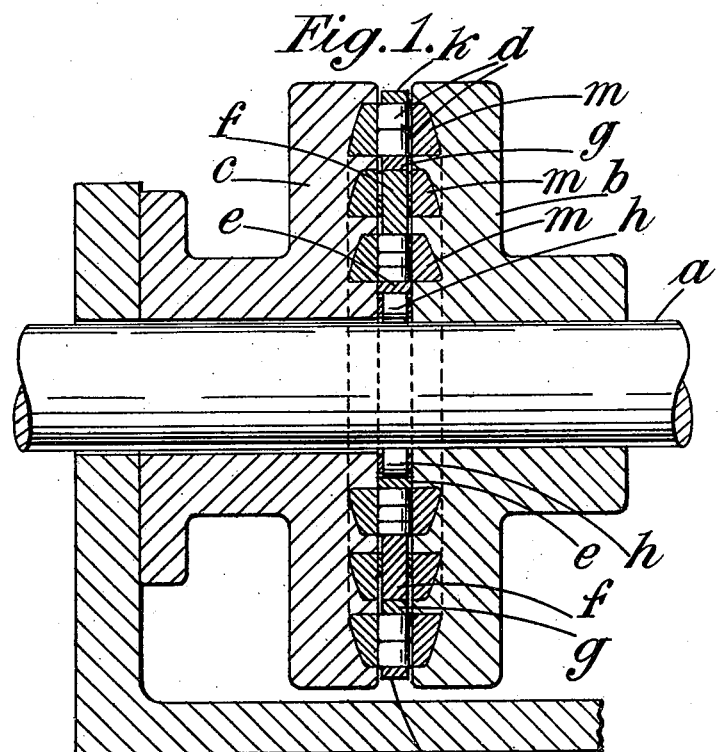
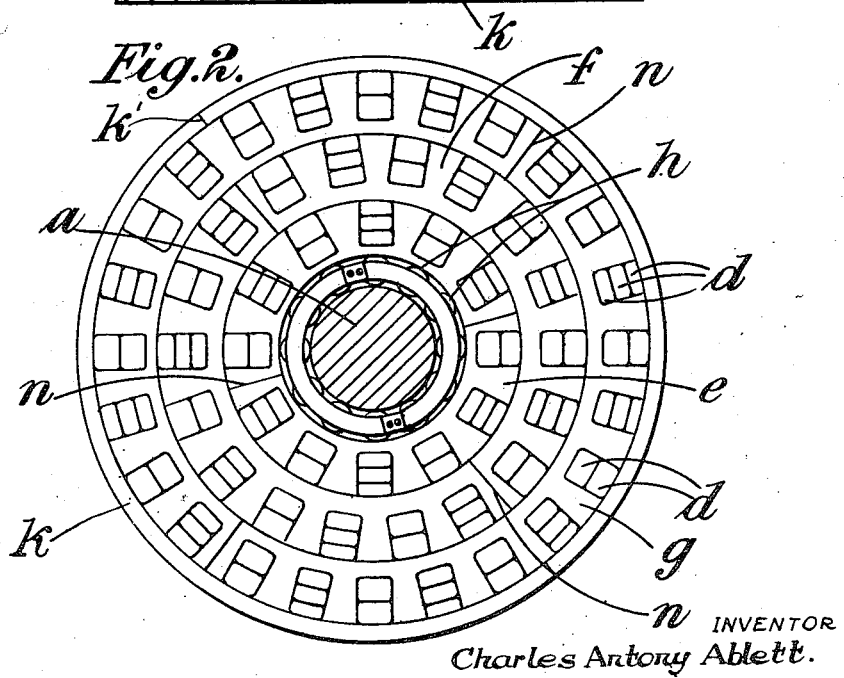
INVENTOR
Charles Antony Ablett.
BY Cameron, Kerkam + Sutton
ATTORNEYS Feb. 5, 1952 — C. A. ABLETT — 2,584,652
ROLLER THRUST BEARING
Filed Nov. 14, 1949 — 4 Sheets-Sheet 2

INVENTOR
Charles Antony Ablett.

BY Cameron, Kerkam & Sutton
ATTORNEYS

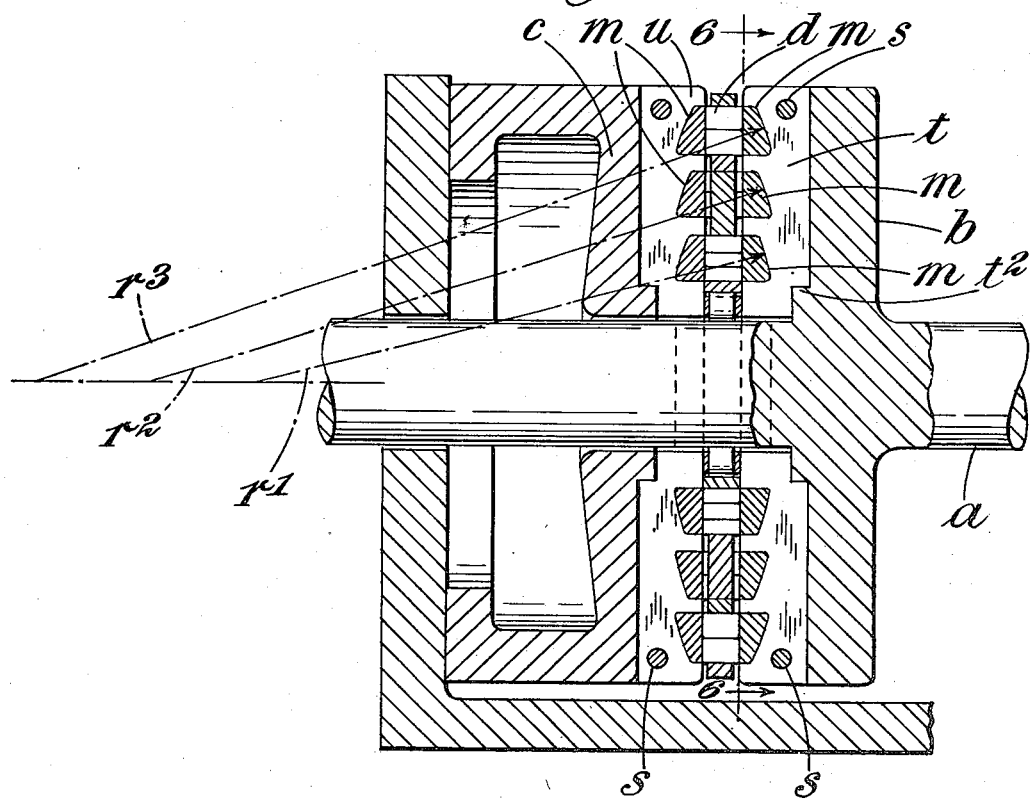

Feb. 5, 1952 C. A. ABLETT 2,584,652
ROLLER THRUST BEARING
Filed Nov. 14, 1949 4 Sheets-Sheet 4
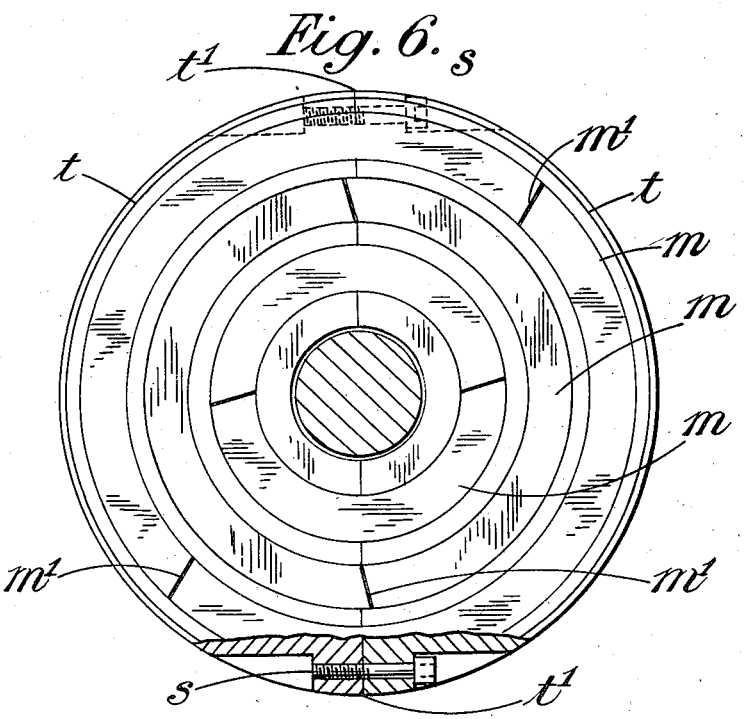
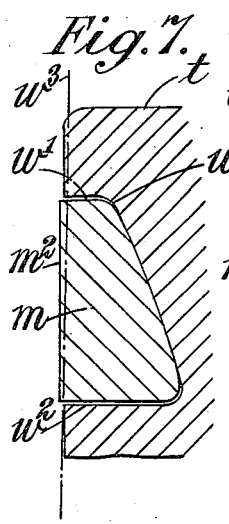 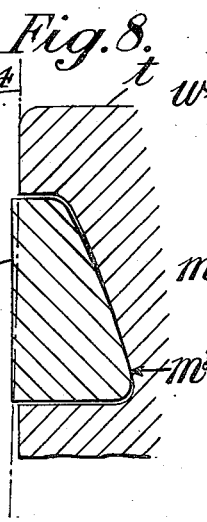 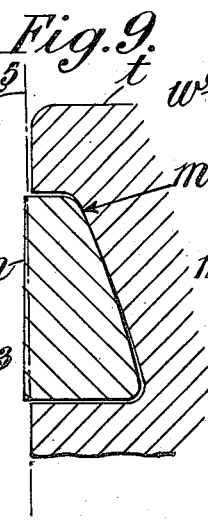 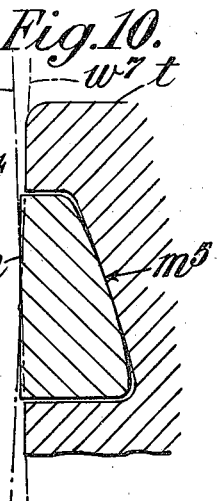
INVENTOR
Charles Antony Ablett.
BY Cameron, Kerkam + Sutton
ATTORNEYS Patented Feb. 5, 1952

2,584,652

UNITED STATES PATENT OFFICE 2,584,652

ROLLER THRUST BEARING

Charles Antony Ablett, King's Lynn, England

Application November 14, 1949, Serial No. 127,137
In Great Britain July 5, 1944

14 Claims. (Cl. 308—234)

1

This invention comprises improvements in roller thrust bearings and is a continuation in part of United States Patent applications Serial Numbers 707,911, now abandoned, and 707,912, filed July 5, 1944, now Patent Number 2,539,682, issued January 30, 1951.

One object of the invention is to provide an improved form of split roller thrust bearing which may be adapted or adopted for use as a thrust bearing block, for example as a thrust bearing block for propeller shafts such as are employed in marine propulsion.

Another object of the invention is to provide an improved form of thrust bearing which can accommodate itself to deflection of the thrust surfaces or races with which the rollers engage.

Peculiar difficulties arise in the design of roller thrust bearings because the various parts of the bearing have to operate at differing radii and therefore at differing peripheral speeds. The surfaces of rollers, unlike ball bearings, afford or are intended to afford continuous line contact throughout the length of the roller. Slipping of the roller surface relative to the raceway surface in which it works is harmful and in order to obviate it, it is essential not only that the rollers should be disposed with their axes radial to the axis of the thrust bearing, but that provision should be made for the peripheral speed of the rollers to be greater at the larger radii than at the smaller radii. It has been proposed to meet this condition by the use of conical rollers, which are larger in diameter at the outer parts of the bearing than they are near the axis of the bearing, the rollers being disposed so that their surfaces if produced would come to a point coincidentally with the axis. This construction complies with the condition that the peripheral speed of the rollers should increase proportionally to the distance from the axis, but it brings in its train the disadvantage that there is a very strong outward radial thrust upon the rollers and if a roller cage is employed, the cage has to take this thrust. It is however, not desirable that a cage should be subjected to such stresses, especially as it leads to the necessity of provision for taking the wear where the ends of the rollers engage the cage, which provision leads to either undue friction or to complication of the construction.

If, on the other hand, plain cylindrical rollers are employed to avoid outward thrust, then as their diameter is the same throughout, there will be slipping at their inner or outward ends. It has been proposed to overcome this by subdividing the rollers into short radial sections and the

2 present invention relates to a bearing of the type having cylindrical rollers arranged in groups comprising rollers of short length considered in a direction radial to the axis of the bearing, the construction being intended to be adapted to take heavy loads with success.

To this end, according to the present invention, it is contemplated to employ a construction in which the support of the raceways is adapted to accommodate itself to the effect of deflections of the parts under load without leading to uneven pressure upon the bearing surfaces, wherein the cage which carries the rollers is adapted to maintain them properly in place without itself producing undue friction and wherein provision is made for a number of separate concentric raceways to be employed if desired.

It will be appreciated that under load conditions, there may be a tendency for the opposed flat thrust taking and thrust imparting surfaces to move away from each other or otherwise to become displaced or distorted out of a true radial plane with the result that the gap between such surfaces or flanges may become displaced laterally or become divergent towards the outer peripheral surface of the cage member. In this connection, it will also be appreciated that distortion of the fixed thrust surface will depend upon the manner in which it is supported. If it is supported by a tubular structure near the shaft, it will probably distort so that the gap will become divergent as already stated. If, however, it is supported by a tubular structure holding the same near its outer periphery, the distortion of the fixed abutment will probably follow the distortion of the movable abutment with the result that the said gap, instead of becoming divergent, may become displaced laterally or caused to assume a curved form. Under such circumstances, the transverse width of the gap may remain constant or may increase slightly or may decrease slightly. Accordingly, and in order to take care of this factor, the relatively short rollers and/or the surfaces on the abutments with which they engage may be so arranged and formed as to enable the load to be distributed evenly and not unduly to load any one part of the thrust bearing in the manner above described. In addition, the relatively short thrust-taking rollers may be formed so that those farthest from the shaft are slightly greater in diameter than those nearest to the shaft and so that the intermediate rollers progressively (radially outward from the shaft) increase in diameter to such an extent as will cause or enable the rollers and the thrust surfaces to engage with each other to secure an even distribution of the load under load conditions. Furthermore, the annular portions or races of the thrust surfaces which are engaged by the relatively short thrust-taking rollers may be stepped back from one another or staggered radially outward from the axis of the shaft with similar effect, it being appreciated that in either arrangement the staggering or the diameter variations should be such as will conform with the curve of deflection produced or expected in the thrust surfaces under load conditions and will enable a proper distribution of the load to be effected.

It is to be understood that the cage member or the annular or ring-like parts constituting the same and the races may be split or made in two or more segmental sections and suitable means provided for retaining or maintaining the individual thrust rollers in their correct positions.

Furthermore, in the case of many types of thrust bearing, including marine thrust bearings such as are referred to hereinabove, it is important to be able to ship and unship the parts without removal of the shaft. The subdividing of the cage and the races into segmental sections is of particular advantage in this connection.

Special precautions may be adopted to ensure the smooth running of the parts under heavy loads notwithstanding the fact that a large number of short rollers have to run over joints in the raceways under heavy loads.

The manner in which roller bearing thrust blocks according to the present invention are constructed to meet the above conditions and the various features of such bearings according to the present invention will be apparent from the following description, which is given by way of example of certain constructions in accordance with the invention, reference being made to the accompanying drawings, in which:

Figure 1 shows diagrammatically and in section one mode of carrying the invention into effect;

Figure 2 is a detail view of one form of split cage or series of concentric cages that may be employed to carry the short-thrust taking rollers;

Figure 5 is a longitudinal section through an alternative construction;

Figure 6 is a transverse section upon the line 6—6 of Figure 5; and

Figures 7, 8, 9, and 10 are details illustrating the principle of operation of certain features of the invention.

In the accompanying drawings, the rotary shaft is indicated at $a$. A flange member $b$ is suitably secured to the shaft to form the rotary abutment of a thrust bearing. The fixed abutment is constituted by another flange member $c$ and between the two abutments there is arranged a cage carrying a plurality of separate, spaced, relatively short, thrust rollers $d$. In the preferred form of the invention, the aforesaid cage is made up of a plurality of separate, concentric, annular or ring-like parts each subdivided into segments as indicated at $n$, Figure 2, and having mounted therein one or more sets of radially-disposed, short, thrust rollers. For example, there may be provided three split or divided annular or ring-like parts such as are shown at $e$, $f$, and $g$. A roller bearing having a series of rollers $h$ with their axes arranged parallel with the shaft is disposed between the shaft and the inner annular or ring-like part $e$ in order to support the weight of the cage and so that the cage cannot rub on the shaft. Each annular or ring-like part is provided with a set of radially disposed, short, thrust rollers arranged in radial groups. Along each radial line there may be one or two or more parallel rollers, journalled in suitable radial slots or openings provided for the purpose. Around the outer annular or ring-like part $g$, there is arranged suitable means such as a split locking ring $k$ for preventing the cage elements from separating or flying apart under the influence of the centrifugal forces developed, said means or locking ring being suitably secured to the outermost cage element or annular ring.

The rotary and fixed abutments or flanges are each provided with a plurality of removable or replaceable thrust rings or races such as are shown at $m$, there being a separate ring $m$, for each set of thrust rollers $d$. Such rings or races may be let into annular grooves formed in the fixed and rotary abutments and, if desired, the rings or races and the grooves may be mutually formed to permit slight flexure as hereinafter more fully described.

Figure 3:
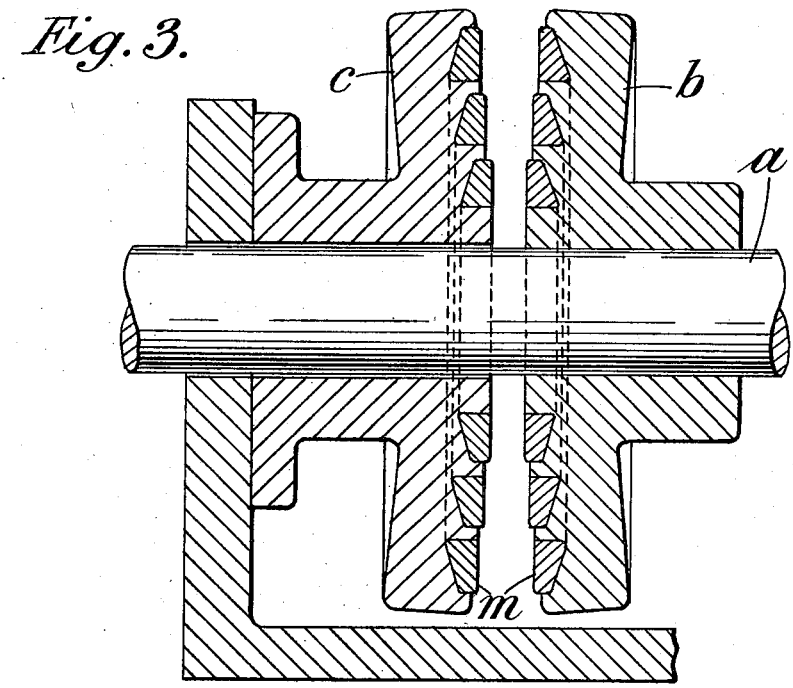
Figure 3 is a diagrammatic view illustrating to an exaggerated degree one manner in which distortion may take place.

In some instances, all of the relatively short thrust-taking rollers may be of the same diameter and the thrust surfaces with which they engage may be disposed in truly radial planes so that the gap between such surfaces is of constant width. In other instances, the relatively short thrust rollers may be formed so that those farthest from the shaft are slightly greater in diameter than those nearest to the shaft and so that the intermediate rollers are of an intermediate diameter or progressively (radially outward from the shaft) increase in diameter to such an extent as will cause or enable the rollers and the thrust surfaces to engage with each other to secure an even distribution of the load under load conditions or to accommodate a distortion effect such as is illustrated to an exaggerated degree in Figure 3 in which the gap between the abutment surfaces becomes divergent or more divergent under the influence of the load.

As already explained the manner in which the thrust surfaces will distort or tend to distort will depend very largely upon the manner in which the fixed abutment is supported. If it is supported in a manner such as is illustrated diagrammatically in Figure 3, the gap between the surfaces in question will tend to widen at its outer periphery or to become divergent or more divergent and, under such circumstances, it is usually preferable to employ thrust-taking rollers which at the outer part of the cage are slightly greater in diameter than those which are situated nearer to the shaft. On the other hand, if the fixed abutment is supported in a manner such as is illustrated diagrammatically in Figure 4, the gap between the surfaces in question may tend to become displaced laterally to assume a curved form and, under such circumstances, parallel-walled rollers all of the same diameter may be used.

It will be seen from Figure 2 of the drawings that the rollers $d$ are arranged in alternate groups around the circumference of each raceway, three rollers in one group and two in the next. In this way scoring of the race surface is obviated. It will furthermore be noted that the successive rings of the cage $e$, $f$ and $g$ are able to rotate relatively to one another and thus the rollers on the successive races are free to assume the speed at which they slip least relative to the raceways and to the cage. With cylindrical rollers on a flat race it is impossible to avoid that there is a slight difference of speed between the roller and the raceway at some part of the length of the roller in an axial direction, but the subdivision of the rollers and arranging of a plurality of them in groups combined with the subdivision of the cage so that each section of the cage is capable of movement at a different speed from the other sections, reduces slipping to a point at which it is immaterial from the point of view of the performance of the bearing. The outer sections of the cage, being held together by the surrounding ring $k$, screwed to it across the joint $k^1$ (Figure 2) serve to keep all the other sections together. The central cage which houses the rollers $h$ is itself split and the halves connected by fishplates so that it can be readily assembled over the shaft $a$.

Figure 4:
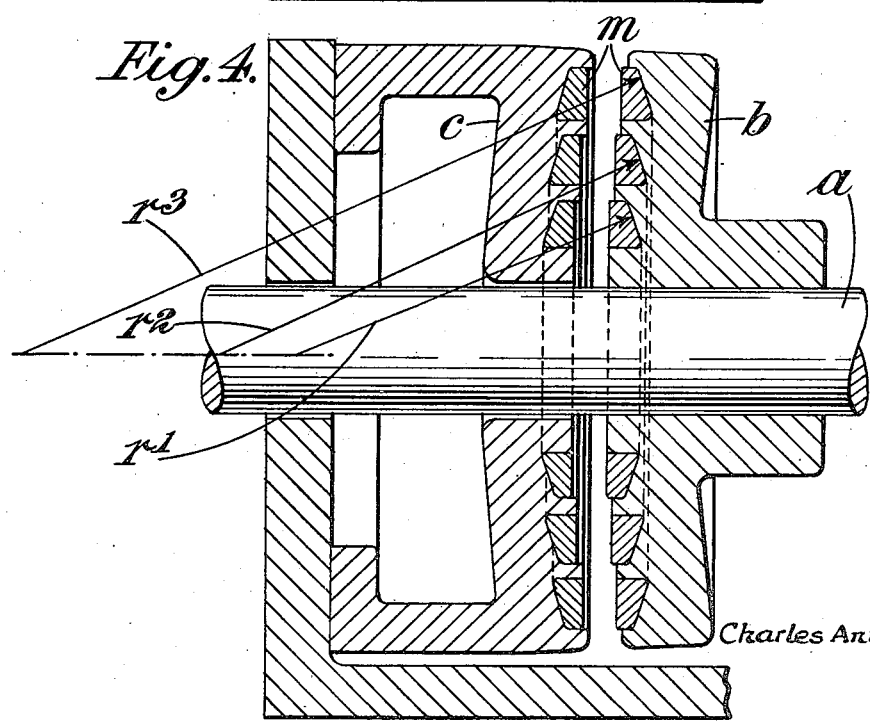
Figure 4 is another diagrammatic view illustrating also to an exaggerated degree another manner in which distortion may take place.

The races $m$ shown in all the figures of the drawings have substantially plane faces to engage the rollers $d$ but inclined rear faces. The inclined rear faces form annular sections of a sphere. In Figure 4 of the drawings the radius of the sphere of the innermost race is indicated at $r^1$, that of the middle race at $r^2$, and that of the outer race at $r^3$ and it will be observed that the spheres centre upon the axis of the shaft $a$. A very small radial clearance is allowed between the inner and outer edges of the races $m$ and the corresponding side faces of the grooves in which they lie for reasons which will hereinafter appear.

Referring now to Figures 5 and 6 of the drawings, these show a roller thrust bearing substantially similar in construction to that shown in Figure 4 and comprising a shaft $a$ on which is a thrust collar $b$ and an abutment $c$. As before, there are hardened raceways $m$ arranged in three concentric grooves in pairs, one of each pair being backed up by the abutment $c$. Again the raceways have spherical rear surfaces as indicated by the radii $r^1$, $r^2$, $r^3$.

In Figure 5 of the drawings however there is interposed between the thrust collar $b$ and the corresponding raceways $m$ a thrust-imparting member $t$. This is made in two parts which are sub-divided diametrically as indicated by the line $t^1$ and the two halves are screwed together by screws $s$ which pass freely through one half of the thrust-imparting member and are screw-threaded in the other half. The thrust-imparting member is centralised relative to the shaft by fitting over a spigot $t^2$ on the shaft.

Similarly on the abutment $c$ is a thrust-receiving member $u$ which is likewise split and held together by screws $s$. The thrust-receiving member and the thrust-imparting member are each of them grooved to receive the raceways $m$. The raceways are themselves split as indicated at $m^1$ in Figure 6. The splits are not radial but are inclined at an angle of about 15° to the radius so that the rollers $d$ pass over the joints gradually and one at a time, not all together.

It is important in using split raceways such as the raceways $m$ that they should be adequately supported and that they should be allowed room to expand and contract and align themselves in order that the roller pressure upon them may be as far as possible equal at all points. In this connection reference is made to Figures 7 to 10 of the drawings which show to an enlarged scale certain features of the arrangement and dimensioning of the races in the grooves of the thrust-imparting and thrust-receiving members, the two members being alike in this respect. Referring to Figure 7 of the drawings the rear faces of the groove in which the raceway member $m$ is seated is indicated at $w$ as being of spherical formation and fitting exactly the rear face of the race member. A small radial clearance $w^1$ is provided between the outer edge of the race member and the corresponding face of the groove and a similar clearance $w^2$ is provided at the inner face. The effect is that the race member, or race members, for it is in two segments, are free to slide across the plane of the thrust member $t$ in and out to the extent permitted by the clearance at $w^1$, $w^2$, the rear face being spherical. If the ring slides to this extent it will be able to align itself with the opposite raceway in the other thrust member of the bearing so that both of them bear evenly on the rollers which they engage notwithstanding that the bearing itself may be minutely out of line, the one half as compared with the other. The clearance allowed it quite small, usually of the order of one thousandth of an inch although it may be greater in some cases. The chain line $w^3$ in Figure 7 of the drawing indicates how the face $m^2$ of the race ring may be displaced by the radial movement of the ring on its spherical seating.

Referring to Figure 8, this shows an additional way in which the race $m$ is free relatively to the other member $t$. If the spherical back of the race is made to bear hard not all over the face of the groove but around a narrow annular seating near one edge of the race as indicated by the arrow $m^3$, the effect is that underpressure from the rollers the race ring $m$ is able to flex and so the position of its section is capable of canting until the face comes into a position such as that indicated in an exaggerated manner by the chain line $w^4$. If the outer rollers of the various groups $d$ are bearing harder upon the raceway than the inner rollers, the flexing of the raceway permits the pressure to be equalised, as between the inner and outer rollers, in addition to the alignment effected by the movement described in connection with Figure 7. Figure 9 shows how if the zone of pressure is made to occur near the outer edge of the back of the race as indicated at $m^4$, a similar flexing occurs in the opposite direction as indicated by the chain line $w^5$. If the groove in which the raceway is seated is made a little flatter than the spherical rear face of the race, the zone of maximum pressure will occur in a more central position as indicated by the arrow $m^5$, Figure 10. In this way the race can flex in either direction as indicated by the chain lines $w^6$ and $w^7$ to equalise pressure on the rollers. It will be understood that both the flexing illustrated by Figures 8 to 10 and the alignment produced by displacement as described with reference to Figure 7 may occur together. Although an actual section of a sphere is shown in the drawings as the shape of the back of the raceway it will be appreciated that for the very small movements which are contemplated and with the relatively narrow radial dimensions of the rings which are shown in the drawings, it may be sufficient for the shape of the backs of the rings to be that of a cone which is tangential to the sphere.

When heavy thrust pressures are being transmitted by the bearing very small degrees of lack of alignment between the shaft $a$ and the thrust abutment c may produce substantial lateral pressures upon the roller cage but the roller bearing h on which the cage runs serves in such cases to prevent the development of undue frictional losses and the combination of the measures described for ensuring alignment and uniform loading of the rollers together with the cage and the supporting race therefor enable very heavy thrusts to be absorbed by a roller thrust bearing according to the present invention notwithstanding the fact that the raceways, the roller cage and the thrust-imparting and receiving members are all split and so capable of ready assembly and disassembly when required, even after the shaft is in place. This is a point of great importance in a bearing such as a marine thrust bearing but the advantage also applies in many other engineering installations.

I claim:

1. A roller-bearing thrust-block comprising in combination a thrust-imparting member, a thrust-receiving member, said two members having opposed thrust-surfaces and being relatively rotatable, at least one raceway receiving groove in each of said opposed thrust surfaces, opposed raceways with flat race surfaces and inclined rear surfaces in each of said grooves, a roller-bearing cage between the raceways, and cylindrical rollers supported in said cage and disposed with their axes radial to the axis of rotation of the thrust-block, said cylindrical rollers being disposed around the raceways in groups each containing a plurality of co-axial rollers, the grooves in said thrust surfaces affording radial clearance to the raceways and abutting upon the inclined backs of the raceways.

2. A roller-bearing thrust-block as claimed in claim 1 wherein the inclined rear surfaces of the raceways form sections of spheres centered upon the bearing axis.

3. A roller-bearing thrust-block as claimed in claim 1 wherein the thrust surfaces bear on limited annular zones at the back of the raceways to permit flexure thereof under load.

4. A roller-bearing thrust-block as claimed in claim 1 wherein a plurality of grooves, concentric with one another, are provided in each thrust surface, each of the grooves having a separate raceway and all the raceways having radial clearance in the grooves and inclined backs and cylindrical rollers arranged in radially disposed groups associated with each raceway.

5. A roller-bearing thrust-block as claimed in claim 1 wherein each of the raceways is split into at least two portions, the joints between the portions being non-radial.

6. A roller-bearing thrust-block as claimed in claim 1 wherein the thrust-imparting and thrust-receiving members consists of split collars around the shaft, means are provided for holding them together, the backs of the collars are machined true with the grooves in their thrust surfaces and backing members are provided, one on the rotating and one on the fixed part of the thrust-block to support the thrust-imparting and thrust-receiving members.

7. In a roller-bearing thrust-block having a thrust-imparting surface carried by a rotatable member and a surface of an abutment adapted to take thrust, a roller-bearing cage interposed between said surfaces and radially disposed relatively short cylindrical thrust rollers mounted in the cage in groups, each consisting of a plurality of such rollers, and a plurality of roller-engaging ring-like races seated in annular grooves formed in at least one of the thrust-imparting and thrust-taking surfaces, the roller-engaging races being formed with a clearance between the races and the grooves and a limited annular bearing on the backs of the grooves to permit slight flexing of each race as viewed in section individually and independently of other race or races relatively to the grooves and to permit the bearing surfaces of the races to align themselves with the surfaces of the rollers.

8. A roller-bearing thrust-block comprising in combination a thrust-imparting member and thrust-taking member said members being rotatable relatively to one another, a plurality of concentric thrust-bearing races on each of said members, a roller cage between the thrust-imparting and thrust-taking members, cylindrical rollers in said cage disposed so that their axes are radial, said rollers being arranged in groups with a plurality of groups disposed between each pair of races, the groups each comprising a plurality of rollers whose axial length is short relatively to the radius from the axis of the thrust bearing at which they operate, said races having rear surfaces to engage at least one of the thrust-imparting and thrust-taking members over a portion of the rear said surface of the races and clearance over another portion whereby the races are enabled to align themselves with the roller surfaces.

9. A roller-bearing thrust-block comprising in combination opposed flat-surfaced race members, each of said members being sub-divided into a plurality of segments, thrust-imparting and thrust-receiving members, substantially spherical seats on the said members to fit the race member segments, the race member segments being shaped to fit said seats and provided with clearance to permit relative movement between the race member segments and the seats, a plurality of concentric series of radially disposed cylindrical rollers between the race members, a plurality of cage members, one for each series of rollers, the cage members fitting one within another and being movable circumferentially relatively to one another, and means for maintaining the cage members concentric with the races.

10. A roller-bearing thrust-block comprising in combination a thrust-imparting member, a thrust-receiving member opposed thereto, a plurality of substantially spherical concentric race member seats in each of the thrust-imparting and thrust-receiving members, a plurality of concentric flat-surfaced race members in said seats, each sub-divided into a plurality of segments and dimensioned to afford clearance so as to permit slight relative movement between said race members and said seats, a series of radially disposed cylindrical rollers between each pair of opposed race members, a separate cage member for each series of rollers, the cage members being sub-divided into segments and dimensioned to fit one within another but to permit relative circumferential movement between them, means to hold the segments of the outermost cage member together and means for maintaining the cage members concentric with the races.

11. A roller-bearing thrust-block as claimed in claim 10 wherein each of the series of rollers between the several races consists of a series of groups of rollers, the rollers in each group being coaxial with one another.

12. A roller-bearing thrust-block as claimed in claim 10 wherein the means for maintaining the cage members concentric with the races comprise a series of roller bearings within the innermost cage member set with their axes parallel to the axis of the thrust block.

13. A roller-bearing thrust-block as claimed in claim 12, wherein the series of rollers which are set with their axes parallel to the axis of the thrust block are spaced apart by a cage member and the cage member is split into a plurality of segments.

14. A roller-bearing thrust-block as claimed in claim 10 wherein the thrust-imparting and thrust-receiving members are sub-divided into a plurality of segments and provided with means to draw the segments of each said member together.

CHARLES ANTONY ABLETT.

REFERENCES CITED

The following references are of record in the file of this patent:

UNITED STATES PATENTS

| Number | Name | Date |
|--------|------|------|
| 673,220 | Perkins | Apr. 30, 1901 |
| 798,096 | Eveland | Aug. 29, 1905 |

FOREIGN PATENTS

| Number | Country | Date |
|--------|---------|------|
| 509,004 | Great Britain | July 10, 1939 |